(12) United States Patent
Hörschläger et al.

(10) Patent No.: US 9,902,562 B2
(45) Date of Patent: Feb. 27, 2018

(54) DEVICE FOR CONVEYING ELONGATE OBJECTS

(71) Applicant: ROSENDAHL NEXTROM GMBH, Pischelsdorf (AT)

(72) Inventors: Werner Hörschläger, Pirka (AT); Alfred Berghofer, Dobersdorf (AT); Karl Schlacher, St. Stefan (AT)

(73) Assignee: ROSENDAHL NEXTROM GMBH, Pischelsdorf (AT)

( * ) Notice: Subject to any disclaimer, the term of this patent is extended or adjusted under 35 U.S.C. 154(b) by 0 days.

(21) Appl. No.: 15/124,135

(22) PCT Filed: Mar. 9, 2015

(86) PCT No.: PCT/AT2015/000035
§ 371 (c)(1),
(2) Date: Sep. 7, 2016

(87) PCT Pub. No.: WO2015/135008
PCT Pub. Date: Sep. 17, 2015

(65) Prior Publication Data
US 2017/0015504 A1    Jan. 19, 2017

(30) Foreign Application Priority Data

Mar. 11, 2014    (AT) .................................. A 174/2014

(51) Int. Cl.
*B65G 15/14* (2006.01)
*B65G 17/12* (2006.01)
(Continued)

(52) U.S. Cl.
CPC ............. *B65G 17/12* (2013.01); *B65G 17/32* (2013.01); *B65G 37/005* (2013.01); *B65H 57/14* (2013.01);
(Continued)

(58) Field of Classification Search
USPC ...... 198/604, 606, 620, 626.1, 626.3, 626.5, 198/626.6
See application file for complete search history.

(56) References Cited

U.S. PATENT DOCUMENTS 3,852,555 A    12/1974  Schuocker et al.
4,774,505 A *  9/1988   Ueda .................... B61B 10/025
                                                          198/464.3
(Continued)

FOREIGN PATENT DOCUMENTS

DE    1 059 644 B      6/1959
DE    2 235 359 A1     1/1974
(Continued)

OTHER PUBLICATIONS

International Search Report, dated Jun. 9, 2015, from corresponding PCT Application.

(Continued)

*Primary Examiner* — Gene O Crawford
*Assistant Examiner* — Lester Rushin, III
(74) *Attorney, Agent, or Firm* — Young & Thompson

(57) ABSTRACT

A device (1) designed as a chuck-jaw discharge system for conveying elongate objects includes two chains (3, 4) equipped with chuck jaws (5). The chains (3, 4) are driven by two drives (10). Each of the drives (10) includes an endless roller chain (11), in which toothed edges (13) that are fastened to the chains (3, 4) equipped with chuck jaws (5) engage. The roller chains (11) of the drives (10) are coupled to the straight, adjacent strands of the chains (3, 4) equipped with chuck jaws (5).

10 Claims, 2 Drawing Sheets

(51) Int. Cl.
 *B66D 3/00* (2006.01)
 *B65H 57/14* (2006.01)
 *E21B 19/22* (2006.01)
 *B65G 17/32* (2006.01)
 *B65G 37/00* (2006.01)

(52) U.S. Cl.
 CPC .............. *B66D 3/003* (2013.01); *E21B 19/22* (2013.01); *B65H 2701/33* (2013.01); *B65H 2701/34* (2013.01)

(56) References Cited

U.S. PATENT DOCUMENTS

| | | | |
|---|---|---|---|
| 5,775,415 A | | 7/1998 | Yoshimi et al. |
| 5,775,417 A | * | 7/1998 | Council ................. B65H 51/14 166/77.3 |
| 6,612,223 B2 | * | 9/2003 | Leonard ................... B66F 3/35 254/93 HP |
| 2015/0027939 A1 | * | 1/2015 | Quinones ............. E02B 15/045 210/170.05 |

FOREIGN PATENT DOCUMENTS

| | | |
|---|---|---|
| DE | 2 235 350 A1 | 2/1974 |
| DE | 26 31 723 A1 | 1/1978 |

OTHER PUBLICATIONS

Austrian Search Report, dated Oct. 7, 2014, from corresponding Austrian Application.

\* cited by examiner

DEVICE FOR CONVEYING ELONGATE OBJECTS

BACKGROUND OF THE INVENTION

Field of the Invention

The invention relates to a device for conveying elongate objects, in particular pipes or cables.

Description of the Related Art

Such devices are known (DE 2 235 359 A).

In the case of the device that is known from DE 2 235 350 A, the continuous pulling systems are driven by gears that engage in the pulling systems from the inside. In turn, the gears are driven via reducing gears and shafts of a motor. In this case, however, disadvantageous breakdown torque acts on the chuck jaws that are provided on the pulling systems.

Additional devices for conveying elongate material, such as pipes or cables, are known from DE 26 31 723 A and from U.S. Pat. No. 5,775,415 A.

It is problematic in known devices when the chains that are equipped with chuck jaws are driven via the guide gears. This creates unfavorable mechanical conditions.

SUMMARY OF THE INVENTION

The object of the invention is to make available an improved device of the above-mentioned type ("chuck-jaw discharge system").

This object is achieved according to the invention with a device with two continuous chains (3, 4) that are guided via guide gears (2), which chains are equipped with chuck jaws (5), and with a drive (10) for the chains (3, 4), wherein the drive (10) comprises continuous chains (11), each chain (3, 4) that is equipped with the chuck jaws (5) is coupled to a chain (11) as a drive, the chains (11) of the drives (10) are arranged on both sides of the chains (3, 4) that are equipped with chuck jaws (5), and toothed edges (13) are arranged on both sides of the chains (3, 4) that are equipped with the chuck jaws (5), which edges engage in the chains (11) of the drive (10).

Preferred and advantageous configurations of the invention are also disclosed.

Since, in the invention, the drive for the chains, which are equipped with chuck jaws, engages directly on the chains, more favorable lever conditions are produced, and a better synchronization of the two chains of the chuck-jaw discharge system can be achieved.

For the drive, the invention calls for chains, in particular chains in the form of roller chains, to be provided, which are coupled to the chains that are equipped with chuck jaws.

The coupling is done with toothed edges, which are fastened to the chain links that carry the chuck jaws, and in which the chains of the drive engage.

For the drive of the chains that are equipped with chuck jaws, a separate drive in the form of a chain, e.g., a roller chain, is assigned to each chain that is equipped with chuck jaws.

The drives, designed as chains, of the chains that are equipped with chuck jaws can be synchronized with one another in an arbitrary manner.

It can be provided that the drives are synchronized with one another by an electric shaft.

The invention calls for the chains as drives for the chains that are equipped with chuck jaws to be provided on both sides of the chains that are equipped with chuck jaws. In this case, there can be provided, on each side, one chain each that is coupled to two chains that are equipped with chuck jaws, or, on each side, two chains, each of which is coupled to a chain that is equipped with chuck jaws.

The drive according to the invention is simpler and less susceptible to breakdown than a drive with the guide gears of the chains equipped with chuck jaws.

In one embodiment of the device according to the invention, the guide gears are securely mounted in the machine frame of the device according to the invention.

The traction between chuck jaws and the object to be conveyed that is necessary for the transport of the elongate object is achieved by at least one of the guide rails, on which the insides of the straight strands of the two chains that are equipped with chuck jaws rest, for example using pneumatic means, such as expansion bellows, being pressed onto the straight strand of the opposite chain that is equipped with chuck jaws.

BRIEF DESCRIPTION OF THE DRAWING FIGURES

Additional details and features of the invention follow from the description below of an embodiment based on the drawings. Here:

DETAILED DESCRIPTION OF THE INVENTION

Figure 1:
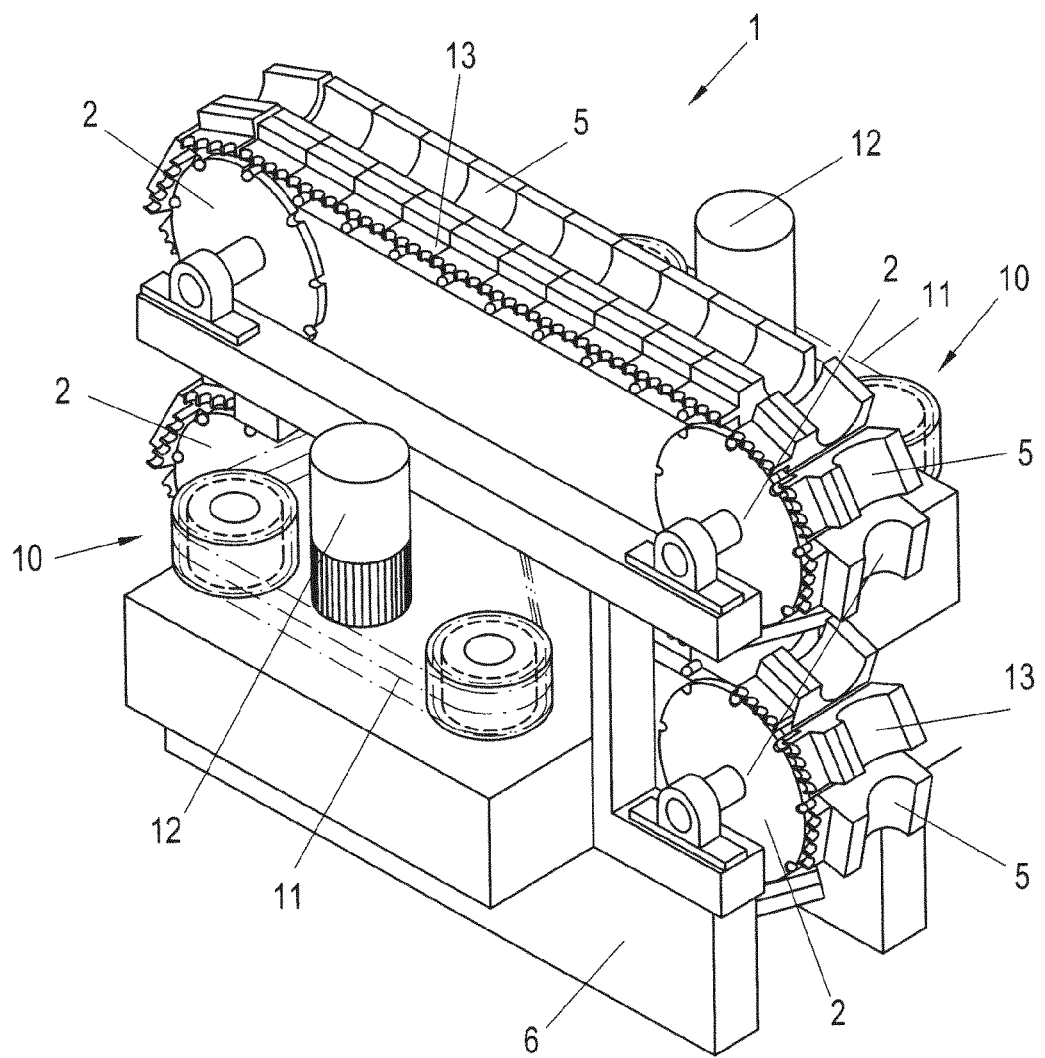
FIG. 1 shows a device according to the invention in an oblique view.

A device 1 according to the invention for conveying elongate objects, in particular pipes or cables, comprises two continuous chains 3, 4 that are guided via guide gears 2. Each of the chains 3, 4 is equipped with a number of chuck jaws 5. The chuck jaws 5 adjoin one another with essentially zero play in the straight sections (strands) of the chains 3, 4. The chuck jaws 5 adjoin the elongate object (pipe or cable) to be conveyed and are pressed against the object, so that the friction, necessary for the conveying of the object, between chuck jaws 5 and object is provided.

The chains 3, 4 of the device 1 according to the invention, equipped with chuck jaws 5, run via the non-driven, i.e., free-wheeling, guide gears 2, which are mounted in a stationary manner in the machine frame 6.

Figure 2:
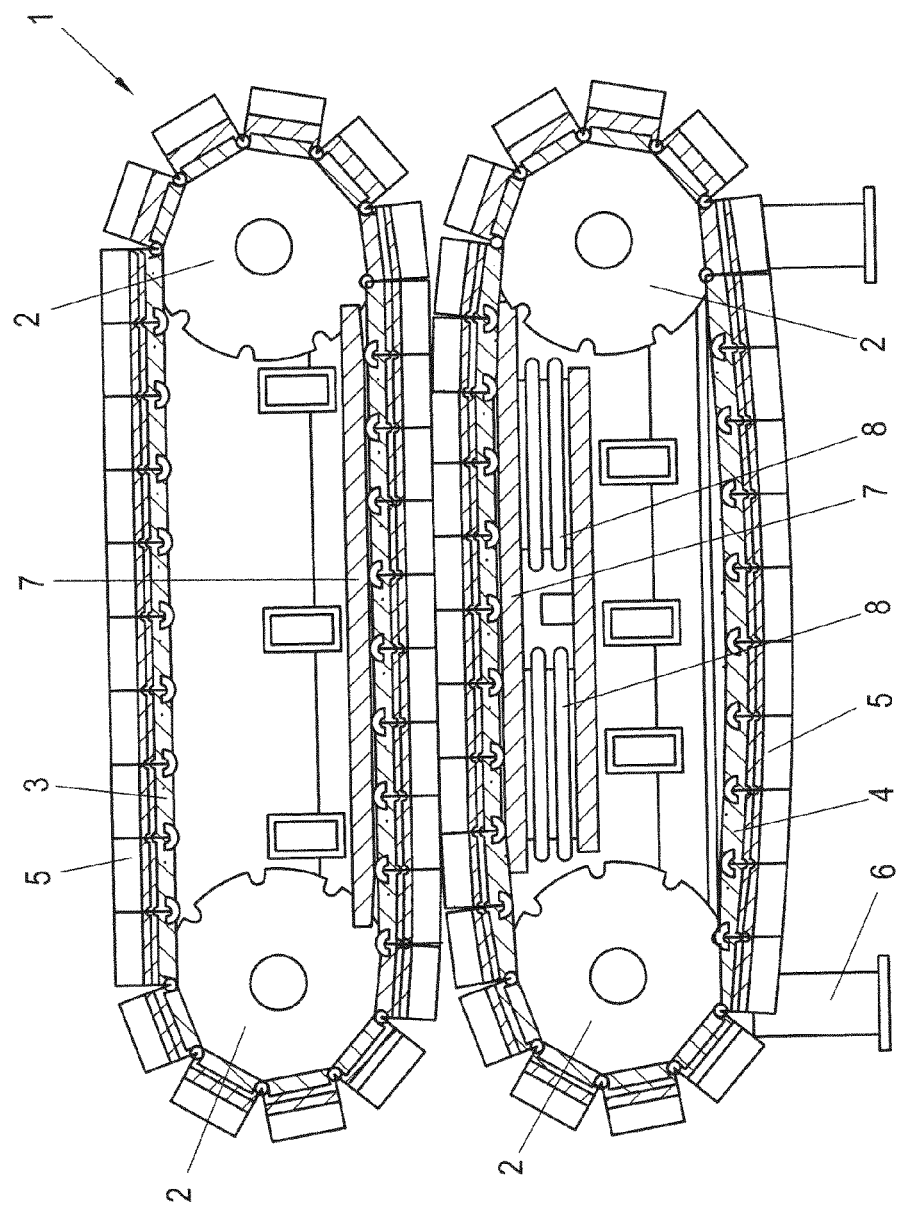
FIG. 2 shows a device according to the invention in side view (without a drive).

Guides 7, which adjoin the insides of the chains 3, 4, are assigned to the straight strands, adjacent to one another (cf. FIG. 2), of the chains 3, 4 that are equipped with chuck jaws 5.

In this connection, it is preferably provided within the scope of the invention that one of the guides 7, the guide 7 in the embodiment shown, of the straight strand of the upper continuous chain 3 that is equipped with chuck jaws 5, is mounted in a stationary manner in the machine frame 6.

The guide 7 for the lower chain 4, equipped with chuck jaws 5, is loaded on the straight strand of the upper chain 3, equipped with chuck jaws 5, using expansion bellows 8 to which pressurized gas (air) can be applied. Thus, the necessary friction between the elongate object to be conveyed and the chuck jaws 5, which is necessary for the problem-free and uniform conveying of the elongate object, is achieved.

In the embodiment shown, drives 10 that are arranged on sides that are opposite to one another in relation to the chains 3, 4, i.e., on both sides of the chains 3, 4, are assigned to the chains 3, 4. Each of the drives 10 comprises a multi-barreled roller chain 11, to which a drive motor 12 is assigned. The drive motors 12 of the two drives 10 are (electrically) coupled to one another. On the lateral surfaces of the links, of the chains 3, 4 that are equipped with chuck jaws 5, toothed edges 13 are arranged, in which the roller chain 11 engages, so that the chains 3, 4 that are equipped with chuck jaws 5 are driven synchronously. The chains 11 of the drives 10 engage in the straight strands of the chains 3, 4 that are equipped with chuck jaws 5, i.e., in the area where the chuck jaws 5 adjoin one another or rest on the object to be conveyed.

The design according to the invention makes it possible for the toothed edges 13 to be arranged essentially in the middle of the chuck jaws 5, so that favorable lever ratios are produced and no breakdown torque occurs on the chuck jaws 5 because of the drives 10.

Since, as in the embodiment shown, both chains 3, 4 that are equipped with chuck jaws 5 are driven by a common drive 10 with one multi-barreled roller chain 11 each, a synchronous movement of the chains 3, 4 equipped with chuck jaws 5 is ensured.

In summary, an embodiment of the invention can be described as follows.

A device 1 that is designed as a chuck-jaw discharge system for conveying elongate objects comprises two chains 3, 4 that are equipped with chuck jaws 5. The chains 3, 4 are driven by two drives 10. Each of the drives 10 comprises a continuous roller chain 11, in which toothed edges 13 fastened to the chains 3, 4 that are equipped with chuck jaws 5 engage. The roller chains 11 of the drives 10 are coupled to the straight strands, adjoining one another, of the chains 3, 4 that are equipped with chuck jaws 5.

The invention claimed is:

1. A device for conveying elongate objects, pipes or cables, comprising:
    two continuous chains that are guided via guide gears, the two continuous chains being equipped with chuck jaws; and
    a drive for the two continuous chains,
    wherein the drive comprises continuous drive chains, each of the two continuous chains is equipped with the chuck jaws is coupled to the drive chain as a drive, the drive chains of the drives are arranged on both sides of the two continuous chains that are equipped with the chuck jaws, and toothed edges are arranged on both sides of the two continuous chains that are equipped with the chuck jaws, which edges engage in the drive chains of the drive, and
    the drive chains of the drive are arranged symmetrically in relation to the plane in which the chuck jaws adjoin one another in an area of a straight strand of the two continuous chains.

2. The device according to claim 1, wherein the drive chains of the drive are coupled to strands, which are straight and oriented essentially parallel to one another, of the two continuous chains that are equipped with the chuck jaws.

3. A device for conveying elongate objects, pipes or cables, comprising:
    two continuous chains that are guided via guide gears, the two continuous chains being equipped with chuck jaws; and
    a drive for the two continuous chains,
    wherein the drive comprises continuous drive chains, each of the two continuous chains is equipped with the chuck jaws is coupled to the drive chain as a drive, the drive chains of the drives are arranged on both sides of the two continuous chains that are equipped with the chuck jaws, and toothed edges are arranged on both sides of the two continuous chains that are equipped with the chuck jaws, which edges engage in the drive chains of the drive,
    wherein the drive chains of the drive are multi-barreled roller chains (11).

4. A device for conveying elongate objects, pipes or cables, comprising:
    two continuous chains that are guided via guide gears, the two continuous chains being equipped with chuck jaws; and
    a drive for the two continuous chains,
    wherein the drive comprises continuous drive chains, each of the two continuous chains is equipped with the chuck jaws is coupled to the drive chain as a drive, the drive chains of the drives are arranged on both sides of the two continuous chains that are equipped with the chuck jaws, and toothed edges are arranged on both sides of the two continuous chains that are equipped with the chuck jaws, which edges engage in the drive chains of the drive,
    wherein the toothed edges, which couple the drive chains of the drive to the two continuous chains that are equipped with the chuck jaws, are arranged on the lateral surfaces of the chuck jaws.

5. The device according to claim 1, wherein the straight strands, facing one another, of the two continuous chains that are equipped with the chuck jaws are guided by guides, and wherein one of the guides can be moved to a position crosswise to the straight strands.

6. The device according to claim 5, wherein a pneumatic adjusting drive, comprising at least one expansion bellows, is assigned to the adjustable guide.

7. The device according to claim 1, wherein the drive chains of the drive are two-barreled or multi-barreled chains, and wherein one barrel of each of the drive chains of the drive is coupled to a chain of the two continuous chains that is equipped with the chuck jaws.

8. The device according to claim 1, wherein guide gears for the two continuous chains that are equipped with the chuck jaws are free-wheeling gears.

9. The device according to claim 1, wherein guide gears for the two continuous chains that are equipped with the chuck jaws are mounted securely to a machine frame.

10. The device according to claim 1, wherein the drive chains of the drives are synchronized with one another by an electric shaft.

* * * * *